United States Patent
Conner

(10) Patent No.: US 11,724,625 B2
(45) Date of Patent: Aug. 15, 2023

(54) COMFY CARRIER

(71) Applicant: Chimere Elaine Conner, Houston, TX (US)

(72) Inventor: Chimere Elaine Conner, Houston, TX (US)

( * ) Notice: Subject to any disclaimer, the term of this patent is extended or adjusted under 35 U.S.C. 154(b) by 0 days.

(21) Appl. No.: 17/505,066

(22) Filed: Oct. 19, 2021

(65) Prior Publication Data
US 2022/0111777 A1    Apr. 14, 2022

Related U.S. Application Data

(60) Provisional application No. 63/179,260, filed on Apr. 24, 2021.

(51) Int. Cl.
*B60N 2/28*    (2006.01)

(52) U.S. Cl.
CPC ......... *B60N 2/2851* (2013.01); *B60N 2/2881* (2013.01)

(58) Field of Classification Search
CPC ............................ B60N 2/2851; B60N 2/2881
See application file for complete search history.

(56) References Cited

U.S. PATENT DOCUMENTS

| | | | | |
|---|---|---|---|---|
| 4,909,573 A | * | 3/1990 | Barry | A47D 1/00 297/452.17 |
| 5,137,335 A | * | 8/1992 | Marten | A47D 15/006 297/181 |
| 9,365,136 B2 | * | 6/2016 | Strmiska | B60N 2/2851 |
| 2014/0008945 A1 | * | 1/2014 | Widmann | A47C 7/746 297/180.11 X |

FOREIGN PATENT DOCUMENTS

GB        2529626 A  *  3/2016  ............. A47C 20/02

* cited by examiner

*Primary Examiner* — Anthony D Barfield

(57) ABSTRACT

Illustrated views of an exemplary self-cooling pillow for cooling a child car safety seat and stroller is presented. The self-cooling pillow is useful to help keep a child cool on hot and warm day as well as warm on cool days. The self-cooling pillow is further useful for controlling the temperature of the safety seat and stroller which makes travelling more enjoyable for the child and its parents. Furthermore, the self-cooling pillow helps to reduce stress on parents, care providers and other passengers in the event of car seat usage on a warm, hot or even cool day.

3 Claims, 2 Drawing Sheets

COMFY CARRIER

FIELD OF THE INVENTION

This invention relates to child car seats and strollers. More particularly, it relates to a self-cooling padding for a child car seat or stroller.

BACKGROUND

A child safety seat, sometimes called an infant safety seat, child restraint system, child seat, baby seat, car seat, or a booster seat, is a seat designed specifically to protect children from injury or death during vehicle collisions. Most commonly these seats are purchased and installed by car owners, but car manufacturers may integrate them directly into their vehicle's design and generally are required to provide anchors and ensure seat belt compatibility.

Strollers are used for small children up to about three years old in a sitting position facing forward. A variety of twin pushchairs are manufactured, some designed for babies of a similar age (such as twins) and some for those with a small age gap. Triple pushchairs are a fairly recent addition, due to the number of multiple births being on the increase. Safety guidelines for standard pushchairs apply. Most triple buggies have a weight limit of 50 kg and recommended use for children up to the age of 4 years.

A travel system is typically a set consisting of a chassis with a detachable baby seat and/or carrycot. Thus, a travel system can be switched between a pushchair and a pram. Another benefit of a travel system is that the detached chassis (generally an umbrella closing chassis when folded will usually be smaller than other types, to transport it in a car trunk or boot. Also, the baby seat will snap into a base meant to stay in an automobile, becoming a car seat. This allows undisturbed movement of the baby into or out of a car and a reduced chance of waking a sleeping baby.

Many jurisdictions require children defined by age, weight, and/or height to use a government-approved child safety seat when riding in a vehicle. Child safety seats provide passive restraints and must be properly used to be effective. However, research indicates that many child safety restraints are often not installed or used properly. To tackle this negative trend, health officials and child safety experts produce child safety videos to teach proper car seat installation to parents and caregivers.

During warm or hot days, cars get hot on the inside. When the inside of the car gets hot, the child safety seat also gets very hot. Children are strapped into the safety seat and movement is limited which adds to the effects of the heat in the car and from the fabric of the safety seat that absorbs the heat. This can lead to itching, burning, and discomfort.

Accordingly, and in light of the foregoing, there exists a need for a padding or similar insert that can cool a child safety seat and can also be used for strollers.

DETAILED DESCRIPTION

Figure 1A:
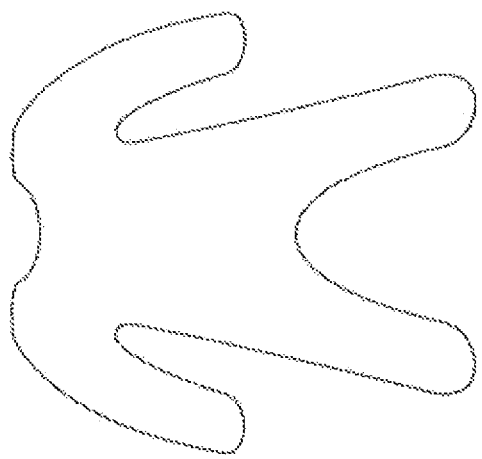
FIG. 1A is an illustrated view of an exemplary cooling pillow.
Figure 1A:
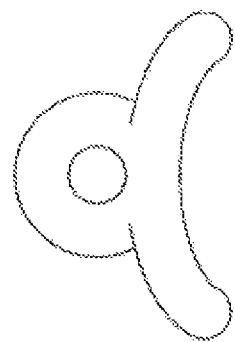

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Above," "adhesive," "affixing," "any," "around," "both," "bottom," "by," "comprising," "consistent," "customized," "enclosing," "friction," "in," "labeled," "lower," "magnetic," "marked," "new," "nominal," "not," "of," "other," "outside," "outwardly," "particular," "permanently," "preventing," "raised," "respectively," "reversibly," "round," "square," "substantial," "supporting," "surrounded," "surrounding," "threaded," "to," "top," "using," "wherein," "with," or other such descriptors herein are used in their normal yes-or-no sense, not as terms of degree, unless context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 1B:
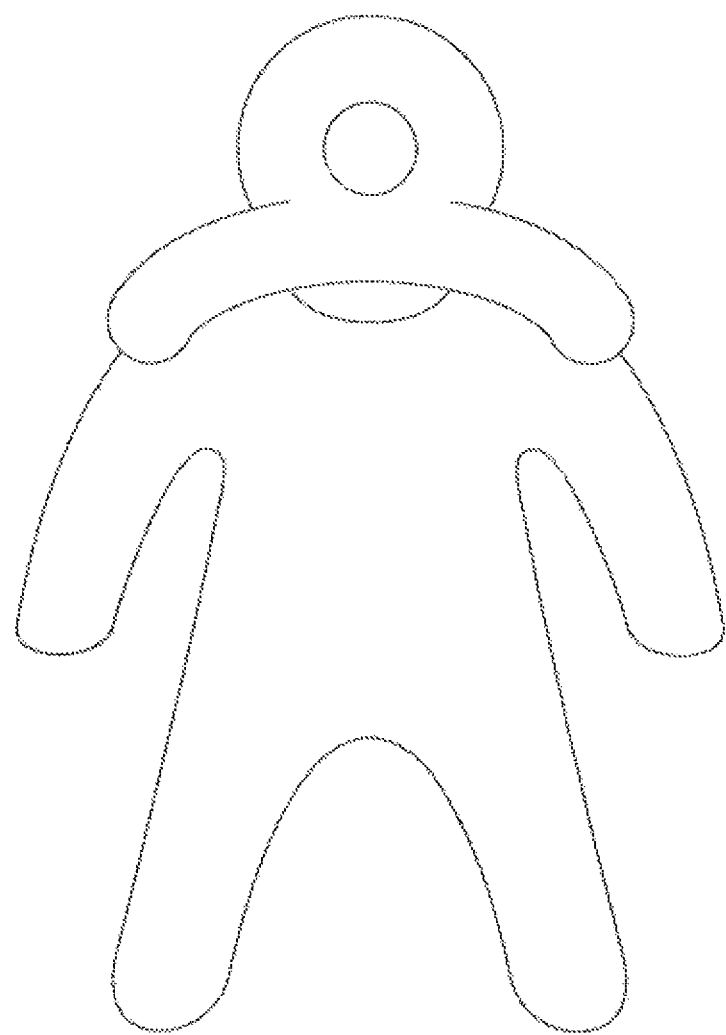
FIG. 1B is an illustrated view of a combination of component of the cooling pillow shown in FIG. 1A.

Referring to FIG. 1A and FIG. 1B, illustrated views of an exemplary detachable self-cooling pillow for cooling a child car safety seat and stroller is presented. The self-cooling pillow is useful to help keep a child cool on hot and warm days as well as warm on cool days. The self-cooling pillow is further useful for controlling the temperature of the safety seat and stroller which makes travelling more enjoyable for the child and its parents. Furthermore, the self-cooling pillow helps to reduce stress on parents, care providers and other passengers in the event of car seat usage on a warm, hot or even cool day.

The detachable self-cooling pillow is preferably made of a soft material, such as cloth, suede, cotton, etc., however other materials are hereby contemplated, including, but not limited to, leather, wool, fleece, etc. The self-cooling pillow is preferably a size of a toddler, however other sizes are hereby contemplated, including, but not limited to, a baby, an early teen, etc.

The detachable self-cooling pillow has a head piece pillow and a body piece pillow. The head piece pillow is preferably shaped to be a head and shoulders. The body piece pillow is preferably shaped to be a body, arms and legs.

The head piece pillow has a front, a back, a bottom, a head, a right shoulder and a left shoulder. A left end of the right shoulder is coupled to the right end of the left shoulder forming a U-like shape. The U-like shape of the right shoulder and left shoulder has a top, a bottom, a back, a front and a center.

The head of the head piece pillow is shaped in the form of a human head. The head has a bottom, a top, a front and a back. The bottom of the head is coupled to the middle of the top of the U-like shape. The head piece pillow has an interior, the interior of the head piece pillow has a padding.

The head can be cooled by putting into the refrigerated container such as a refrigerator and warmed to warm the head/shoulders. The back of the head piece pillow as an insulated cover; thus, heat or cooling will not be affected in an adverse fashion.

The body piece pillow has a front, a back, a top, a center, two arms and two legs and a trunk. A top of each of the legs are coupled to a bottom of the trunk. The arms are coupled to an upper portion of each side of the trunk. An interior of the body piece pillow has a stuffing and a cavity. The cavity is configured to hold a gel. The gel is contained in a flexible plastic liner.

The back of the body piece pillow has an insulated cover; thus, heat or cooling will not be affected in an adverse fashion.

In FIG. 1B the head piece pillow is coupled to the body piece pillow to form the self-cooling pillow. The center of the bottom of the head piece pillow is coupled to the center of the top of the body piece pillow by a coupling. The coupling is preferably a hook and loop fastener, such as a Velcro®-like fastener, however other types of couplings are hereby contemplated, including, but not limited to, two-sided tape, a zipper, button, snaps, etc.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claim is:

1. A detachable connected self-cooling pillow for the cooling of a child car safety seat and stroller, the self-cooling pillow comprising of:
   a separable head piece pillow, the head piece pillow comprising
      a head, the head having an interior, a top, a bottom, a center and a back,
   wherein the back having an insulated cover, the interior having a stuffing;
      a right shoulder, the right shoulder having a first end and a second end;
      a left shoulder, the left shoulder having a first end and a second end;
      the first end of the right shoulder being coupled to the second end of the left shoulder forming a shoulder portion, the shoulder portion having a top and an interior, the top having a center, the interior having a stuffing, therein the center of the bottom of the head being coupled to the center of the top of the shoulder portion by a coupling;
   a separable body piece pillow, the body piece pillow comprising:
      a body, the body having an upper portion, a first side, a second side, a top, a bottom and an interior, the top portion having a center, wherein the interior of the body having a stuffing and a cavity;
      two arms, the first of the arms being coupled to the upper portion of the first side of the body, the second of the arms being coupled to the upper portion of the second side of the body;
      two legs that are divergent from each other, leading in a separate downward extended position, two legs being coupled to the bottom of the body;
   an interior, the interior having a stuffing and a cavity;
   whereby the head and body pillows may be used separately or coupled together by a coupling and the respective shoulders extend outwardly from the head pillow when separated from the body pillow and outwardly and downwardly on top of and along the arms of the body pillow when the head and body pillows are coupled together.

2. The detachable self-cooling pillow of claim 1, wherein the cavity of the interior of the body having a gel.

3. The detachable self-cooling pillow of claim 2, wherein the gel being configured to be in a flexible plastic liner.

* * * * *